United States Patent
Ethirajan et al.

[19]
[11] Patent Number: 6,137,200
[45] Date of Patent: Oct. 24, 2000

[54] COMPLIANT MOTOR ROTOR RETAINER

[75] Inventors: Arulmani Ethirajan, Roy, Utah; Dennis D. Ogden, Longmont, Colo.

[73] Assignee: Iomega Corporation, Roy, Utah

[21] Appl. No.: 09/287,158

[22] Filed: Apr. 6, 1999

[51] Int. Cl.[7] .............................. H02K 5/00; H02K 5/24; H02K 7/06; H02K 7/00; H01R 39/40

[52] U.S. Cl. .............................. 310/90; 310/89; 310/91; 310/246; 310/51; 310/81; 310/66; 310/67 R; 310/116; 310/117; 310/121

[58] Field of Search .................................. 310/90, 89, 91, 310/246, 51, 81, 66, 67 R, 116, 117, 121; 360/99.12; 369/772

[56] References Cited

U.S. PATENT DOCUMENTS

| | | | |
|---|---|---|---|
| 5,210,665 | 5/1993 | Nishizawa | 360/99.08 |
| 5,461,523 | 10/1995 | Hoshi | 360/99.12 |
| 5,557,487 | 9/1996 | Elsaesser et al. | 360/99.08 |
| 5,617,397 | 4/1997 | Jones et al. | 369/772 |
| 5,623,382 | 4/1997 | Moritan et al. | 360/99.08 |
| 5,751,080 | 5/1998 | Hong | 310/67 R |
| 5,805,555 | 9/1998 | Jones et al. | 369/772 |

*Primary Examiner*—Clayton LaBalle
*Assistant Examiner*—Guillermo Perez
*Attorney, Agent, or Firm*—Woodcock Washburn Kurtz Mackiewicz & Norris LLP

[57] ABSTRACT

A disk drive has a sleeve-bearing spindle motor having a rotor for rotating the disk of removable data storage cartridge. A retainer which is compliant in the direction of axial movement of the rotor stops the axial movement. The retainer is mounted on a moveable platform which mounts the disk cartridge as it is inserted into the drive. The retainer includes a cantilevered beam which is compliant in the direction of axial movement.

9 Claims, 4 Drawing Sheets

COMPLIANT MOTOR ROTOR RETAINER

BACKGROUND

1. Field of the Invention

The present invention relates to a data storage device, or disk drive, for receiving a removable disk cartridge. More particularly, the present invention relates to a movable platform which has compliant retainers for the rotor of the spindle motor.

2. Description of the Prior Art

Removable disk cartridges for storing digital electronic information typically comprise an outer casing or shell that houses a rotatable recording medium, or disk, upon which electronic information can be stored. The cartridge shell often comprises upper and lower halves that are joined together to house the disk. The disk is mounted on a hub that rotates freely within the cartridge. When the cartridge is inserted into a disk drive a spindle motor in the drive engages with the disk hub in order to rotate the disk within the cartridge.

Disk drives for receiving removable disk cartridges must have some mechanism for bringing the hub of a disk cartridge into engagement with the spindle motor of the disk drive and for maintaining tight tolerances between the cartridge hub, spindle motor and magnetic head actuator of the disk drive. U.S. Pat. Nos. 5,617,397 and 5,805,555, Jones, et al., Movable Platform For a Disk Drive, describe such a mechanism. This disk drive commonly referred to as the ZIP drive. This drive has a ball-bearing spindle motor. Ball-bearing motors have limited rotor movement in the Z, or axial direction. The ball-bearing motors used in the ZIP drive retain the rotor with the bonded and preloaded ball-bearings.

Recently spindle motors of the sleeve bearing type have been used. For example, CD/ROM motors use sleeve-bearing spindle motors. A sleeve-bearing needs a feature which stops the rotor assembly from coming out of the magnetic attraction range between the rotor magnet and the stator. CD/ROM motors having sleeve-bearing motors use various of types of retainers to limit the Z-axial movement of the rotor. These designs typically have one or two parts which are used for retainers. The addition of these parts is expensive. Some retainers and CD/ROM motors require a longer shaft to accommodate a variation of the retainer design.

SUMMARY OF THE INVENTION

In accordance with the present invention a compliant retainer is molded into the moveable platform which mounts the spindle motor in a disk drive.

The spindle motor has a rotor cup with a brim. Two retainers on the platform interface with the brim of the motor cup when the rotor cup tries to escape from the stator assembly. The compliance, or resilience, of the retainers gives the motor a higher tolerance to non-parallelism of the retainers. This lack of parallelism, or offset between the retainers, otherwise causes the spindle motor shaft to bind the against the walls of the sleeve bearing.

In accordance with the present invention the spindle motors and retainers are more flexible and absorb the offset between two retainer interfaces.

Another advantage of the present invention is that stored energy in the compliant retainers help keep the rotor cup from sticking.

Another advantage of the present invention is that no additional parts are required. The retainers are integrated into existing parts. The present invention does not require extra space in the axial direction of the motor.

Further, in accordance with the present invention, the retainers are more tolerant of non-parallelism and offset than rigid retainers.

The foregoing and other objects, features and advantages of the invention will be apparent from the following more detailed description and appended claims.

DETAILED DESCRIPTION OF THE PREFERRED EMBODIMENT

Figure 1:
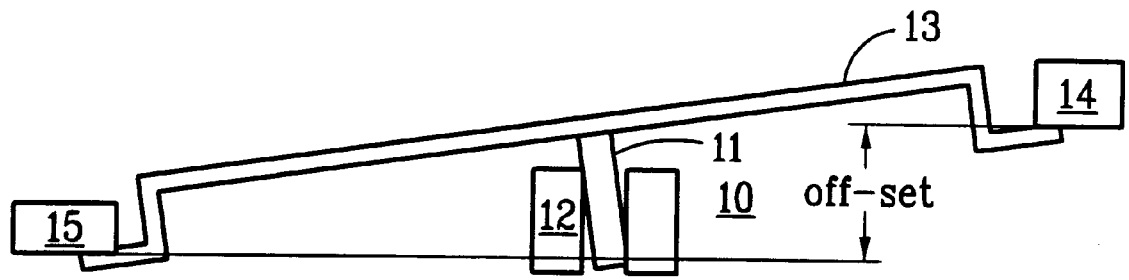
FIG. 1 depicts a prior art sleeve bearing spindle motor showing the binding action when the retainers are not completely parallel to the spinning surface of the rotor cup.

FIG. 1 shows a prior art sleeve bearing spindle motor depicting the binding action of such spindle motors. Spindle motor 10 has a spindle 11 with a sleeve-bearing 12. A rotor cup 13 has a hub engaging portion (not shown) which rotates the hub of a disk in a removable cartridge. In the prior art, the rigid retainers, or stoppers, 14 and 15 are provided to prevent Z axial movement of the rotor cup 13. Because of manufacturing tolerances the retainers 14 and 15 often have an offset. This offset is exaggerated in FIG. 1 but it does depict the binding action which may occur when Z axial movement is stopped by the retainer 14 and 15. Having the retainers at the edge of the rotor cup increases the chance of the rotor cup sticking against the retainers due to an increased distance from the center. The principal contributor to sticking is that the parallel tolerance in the rotor cup at the offset between the retainers causes the spindle shaft 11 to bind against the walls of the sleeve bearing.

Figure 2:
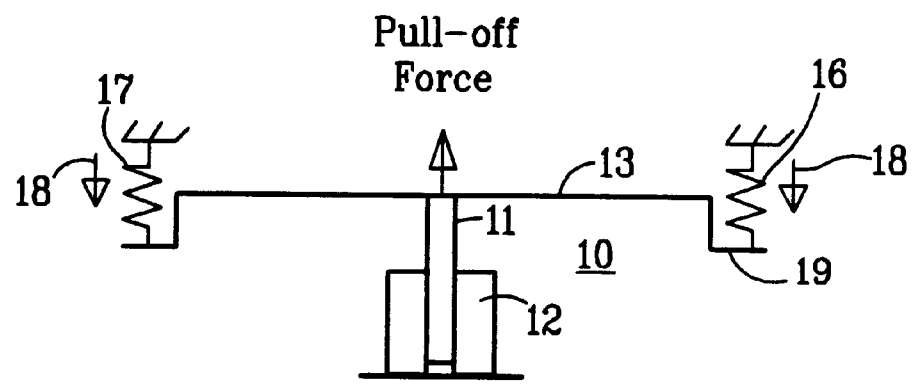
FIG. 2 depicts the compliant stopper action of the present invention.

Unlike the rigid retainers of the prior art, the retainers 16 and 17 (FIG. 2) are flexible and absorb any offset between the two retainer interfaces.

Figure 3:
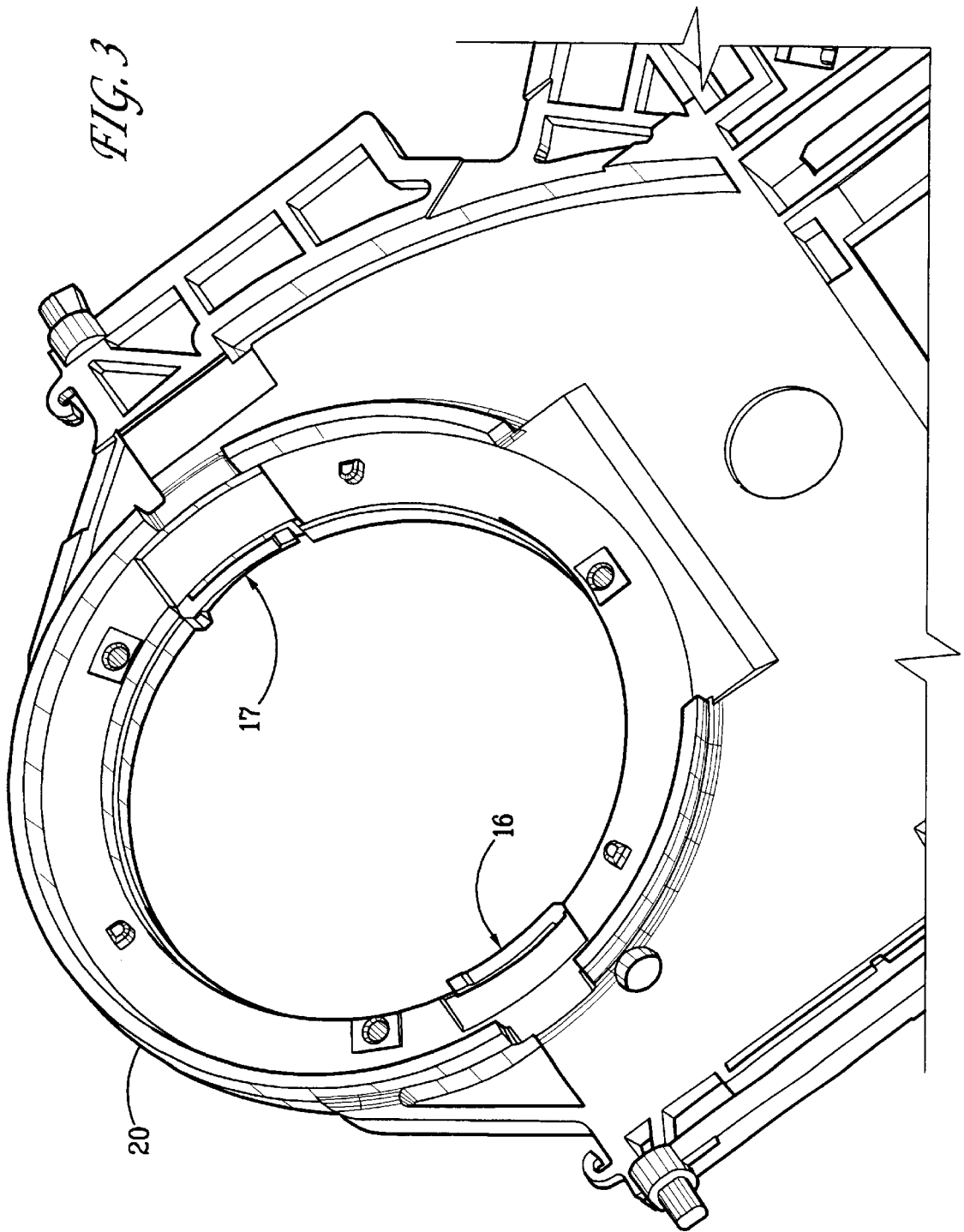
FIG. 3 shows a bottom view of the moveable platform with the compliant retainers of the present invention molded therein.
Figure 4:
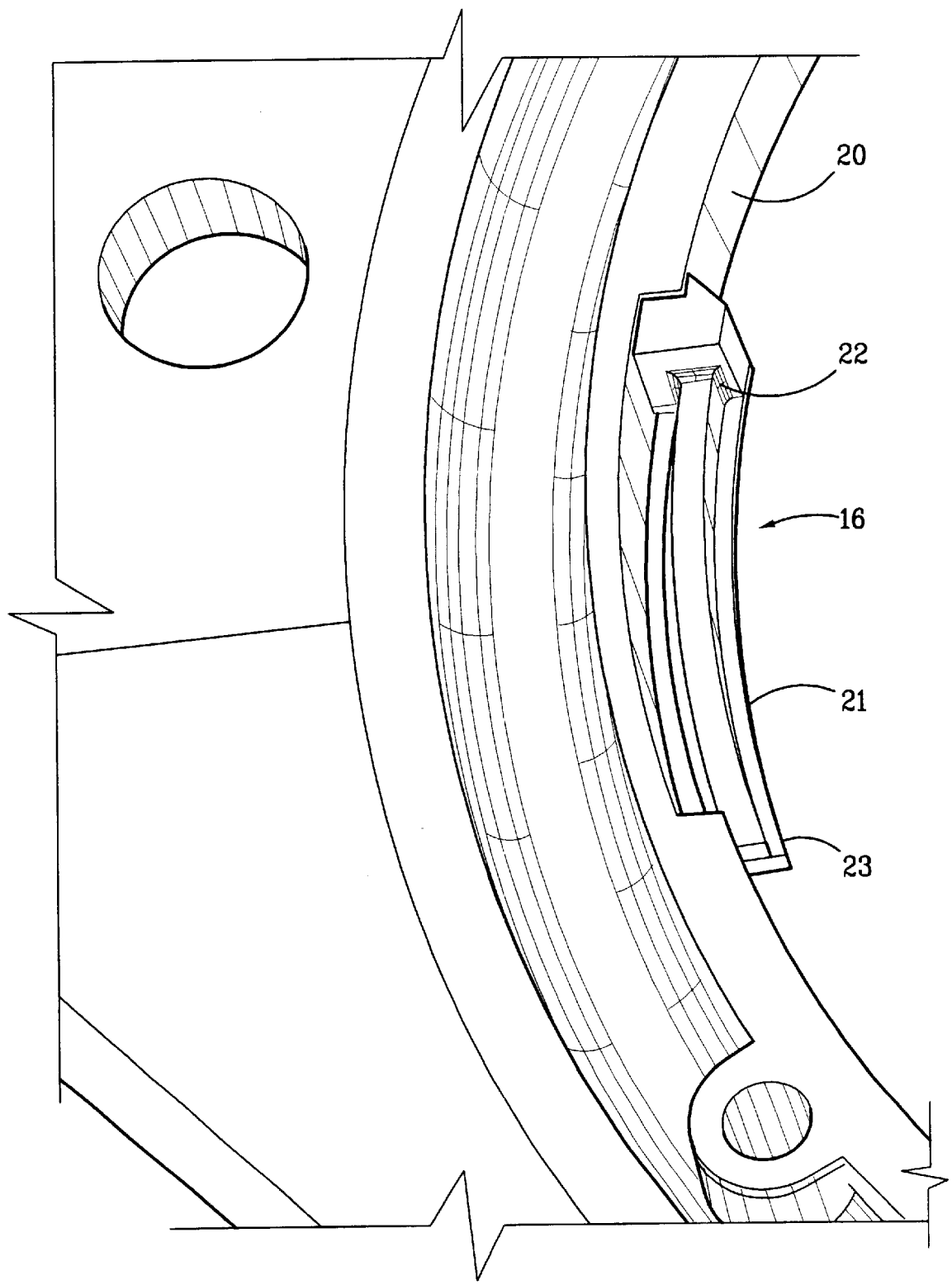
FIG. 4 is a top view of the compliant retainer of the present invention.
Figure 5:
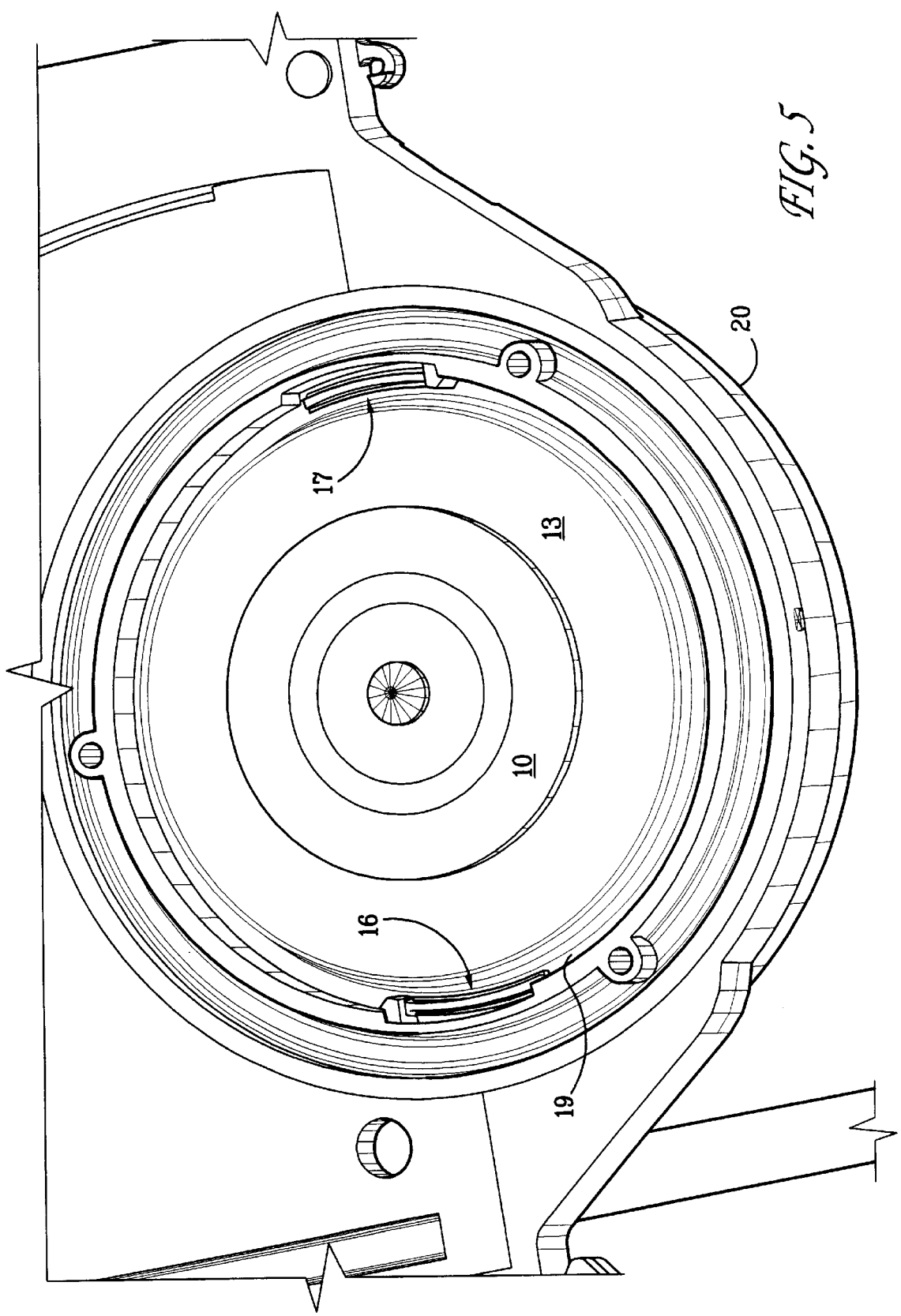
FIG. 5 is a top view of the platform and spindle motor of the present invention.

U.S. Pat. Nos. 5,617,397 and 5,805,555, Jones et al. show a disk drive upon which the present invention is an improvement. FIG. 4 of those patents shows a spindle motor 82 mounted on a moveable platform 50. FIGS. 3–5 of the present application depict the improvement of the present invention on the spindle motor and platform shown in the foregoing patents.

In accordance with the invention, the compliant retainers 16 and 17 are molded into the moveable platform 20 when that part is formed. As best shown in FIG. 4, the retainer 16 is molded to form an elongated member 21 which is affixed to the platform at the end 22. The end 23 is free to move so that the retainer is compliant in the Z-axial direction. The elongated member 21 is a cantilevered beam.

FIG. 5 shows the spindle motor 10 mounted on the platform 20. The spindle motor 10 has a rotor cup 13 with a brim 19. The brim 19 bears against the compliant member 21 when the Z axial movement of the rotor cup tends to exceed its limit.

The compliance of the member 21 makes the jamming moment in the motor bearing less by balancing the retained force on the rotor. This enables the system to function without adding cost to the spin motor either by adding internal features to the motor or by requiring very tight tolerances from the motor supplier.

Various modifications are within the true spirit and scope of the present invention. The appended claims are, therefore intended to cover all such modifications.

What is claimed is:

1. A disk drive that receives a removable disk cartridge comprising;

a chassis;

a moveable platform mounted in said chassis for receiving said disk cartridge as it is inserted into said drive;

a sleeve bearing spindle motor having a rotor for rotating said disk; and a retainer for stopping axial movement of said rotor, said retainer being compliant in the direction of said axial movement, said retainer being on said platform.

2. The disk drive recited in claim 1 wherein said retainer is a molded integral part of said platform.

3. The disk drive recited in claim 2 wherein there are two diametrically opposed retainers on said platform.

4. The disk drive recited in claim 1 wherein said spindle motor has a rotor cup and wherein said rotor cup bears against said retainer to stop axial movement of said rotor.

5. The disk drive recited in claim 1 wherein said rotor cup has a brim and wherein said brim bears against said retainer to stop axial movement of said rotor.

6. The disk drive recited in claim 1 wherein said retainer includes an elongated member which is fixed at one end and is free for movement in said direction of axial movement at the other end thereof.

7. The disk drive recited in claim 6 further comprising:

a platform for receiving said disk cartridge, said elongated member being fixed at said one end to said platform.

8. The disk drive recited in claim 7 wherein said elongated member is a molded integral part of said platform.

9. The disk drive recited in claim 1 wherein said retainer is a cantilevered beam.

* * * * *